(12) United States Patent
Chang

(10) Patent No.: US 8,824,154 B2
(45) Date of Patent: *Sep. 2, 2014

(54) CHIP CARD HOLDER AND ELECTRONIC DEVICE WITH SAME

(75) Inventor: Chia-Hsin Chang, New Taipei (TW)

(73) Assignee: Chi Mei Communication Systems, Inc., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/524,337

(22) Filed: Jun. 15, 2012

(65) Prior Publication Data

US 2013/0235540 A1    Sep. 12, 2013

(30) Foreign Application Priority Data

Mar. 8, 2012 (CN) .......................... 2012 1 0059701

(51) Int. Cl.
*H05K 5/00* (2006.01)

(52) U.S. Cl.
USPC ........... 361/754; 361/737; 361/748; 361/752; 361/769; 361/787

(58) Field of Classification Search
CPC ..... H05K 7/1461; H05K 7/1418; H05K 1/14; G06K 13/06; G06K 13/0831; G06K 7/0039; G06K 13/085; A45C 2011/188; H04B 1/3816; H04M 1/026; H01L 23/5389; H01L 25/0652; H04Q 1/023
USPC ......... 361/737, 748, 752, 754, 759, 769, 787, 361/798, 801, 807, 825, 829, 361/679.31–679.32, 679.38–679.39, 727
See application file for complete search history.

(56) References Cited

U.S. PATENT DOCUMENTS 8,270,175 B2 *  9/2012  Duan et al. ................... 361/737

* cited by examiner

*Primary Examiner* — Robert J Hoffberg
*Assistant Examiner* — Hung Dang
(74) *Attorney, Agent, or Firm* — Novak Druce Connolly Bove + Quigg LLP

(57) ABSTRACT

A chip card holder for holding at least one chip card is disclosed. The chip card holder includes a base, a drawer slidably attached to the base and a cover. The drawer defines at least one receiving space, each receiving space for receiving a chip card. The cover is detachably latched to the base to retain the drawer in the base or allow the drawer to be slid out of the base. After the cover is detached from the base, the drawer can automatically partially or completely slide out of the cabinet to expose it from the base, thereby facilitating grasping chip cards out of the receiving spaces or putting the chip cards in the receiving spaces.

10 Claims, 6 Drawing Sheets

CHIP CARD HOLDER AND ELECTRONIC DEVICE WITH SAME

CROSS-REFERENCE TO RELATED APPLICATIONS

This application is related to co-pending U.S. patent application Ser. Nos. 13/524,331 and 13/524,328, entitled "CHIP CARD HOLDER AND ELECTRONIC DEVICE WITH SAME"; and co-pending U.S. patent application (application Ser. No. 13/453156), entitled "PORTABLE ELECTRONIC DEVICE WITH CHIP CARD HOLDER", all by CHIA-HSIN CHANG. These application have the same assignee as the present application. The above-identified applications are incorporated herein by reference.

BACKGROUND

1. Technical Field

The present disclosure relates to chip card holders, and particularly to electronic devices with chip card holders and methods for putting chip cards.

2. Description of Related Art

Typical draw-out chip card holders include a base and a drawer slidably fixed in the base. When putting a chip card in the drawer, the drawer must first be slid out of the base. However, for steadily fixing the drawer in the base, the drawer is tightly latched in the base, requiring a pin to trigger the drawer so the drawer can slide out of the base. This can be difficult Therefore, there is room for improvement within the art.

BRIEF DESCRIPTION OF THE DRAWINGS

Many aspects of the embodiments can be better understood with reference to the drawings. The components in the drawings are not necessarily drawn to scale, the emphasis instead being placed upon clearly illustrating the principles of the exemplary chip card holder and electronic device using the chip card holders. Moreover, in the drawings like reference numerals designate corresponding parts throughout the several views. Wherever possible, the same reference numbers are used throughout the drawings to refer to the same or like elements of an embodiment.

DETAILED DESCRIPTION

Figure 1:
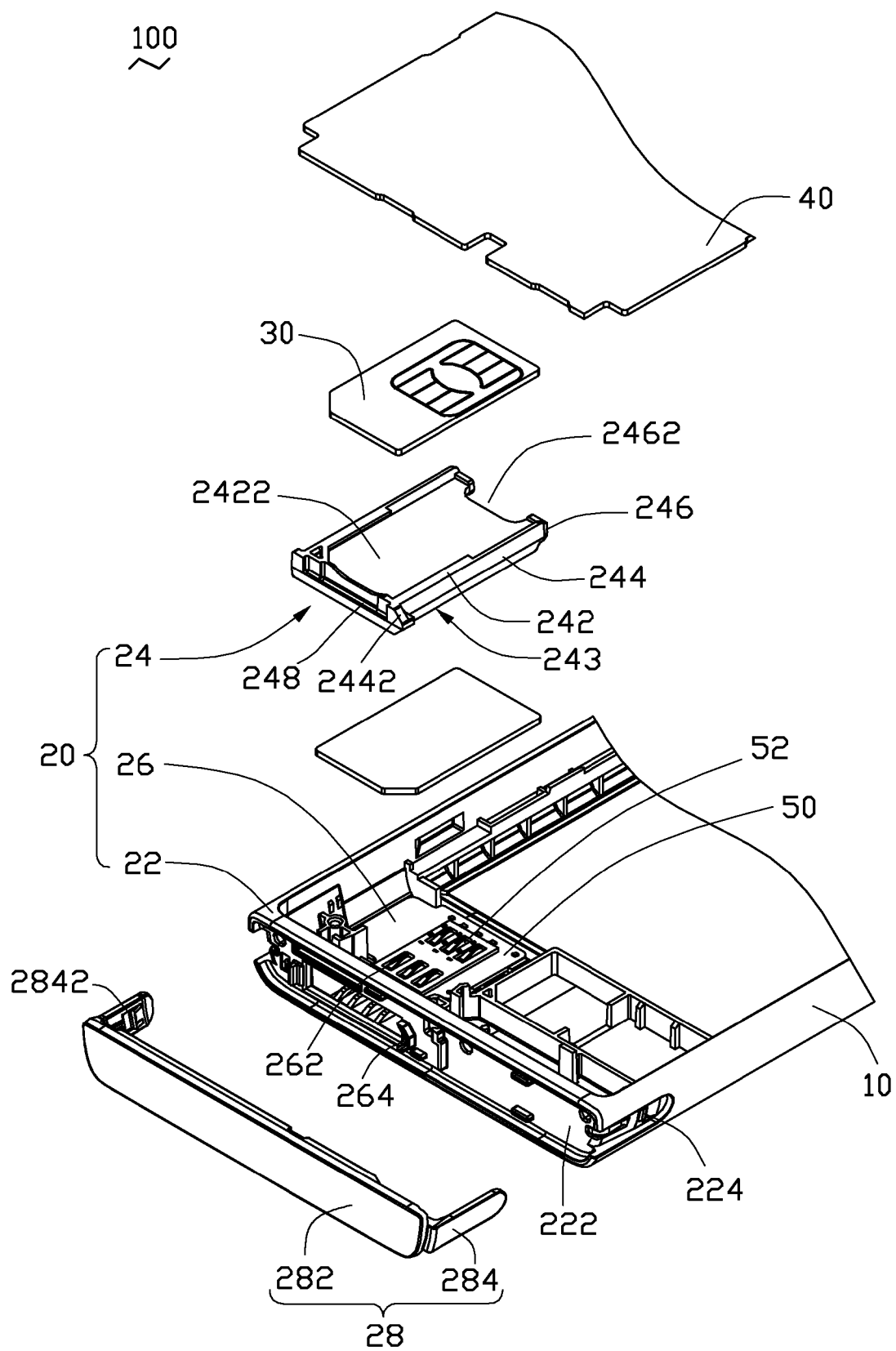
FIG. 1 is an exploded view of a first embodiment of a chip card holder as used in an electronic device, the portion of the electronic device including a housing, two chip cards and a chip card holder.
Figure 2:
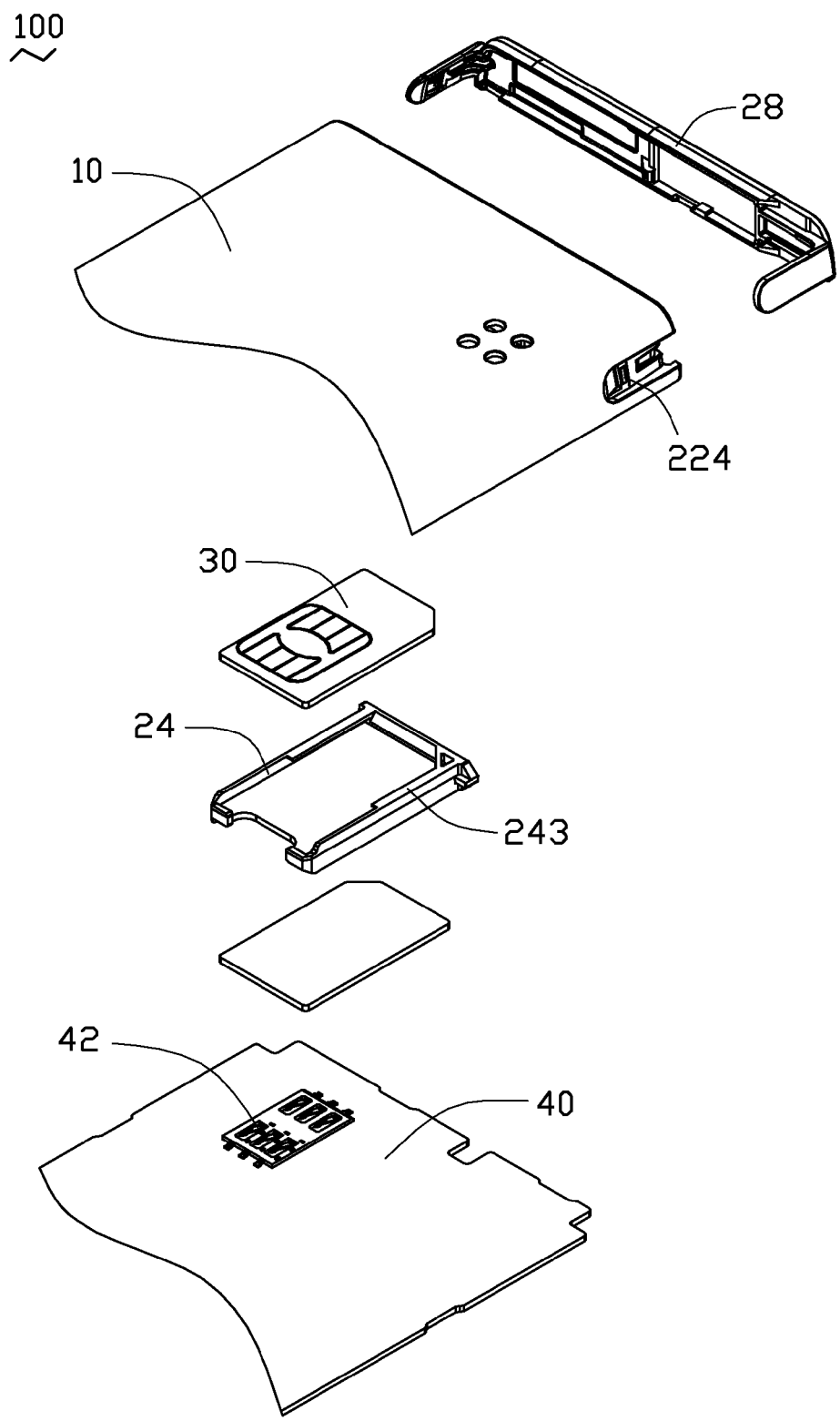
FIG. 2 is similar to FIG. 1, but viewing from anther aspect.
Figure 3:
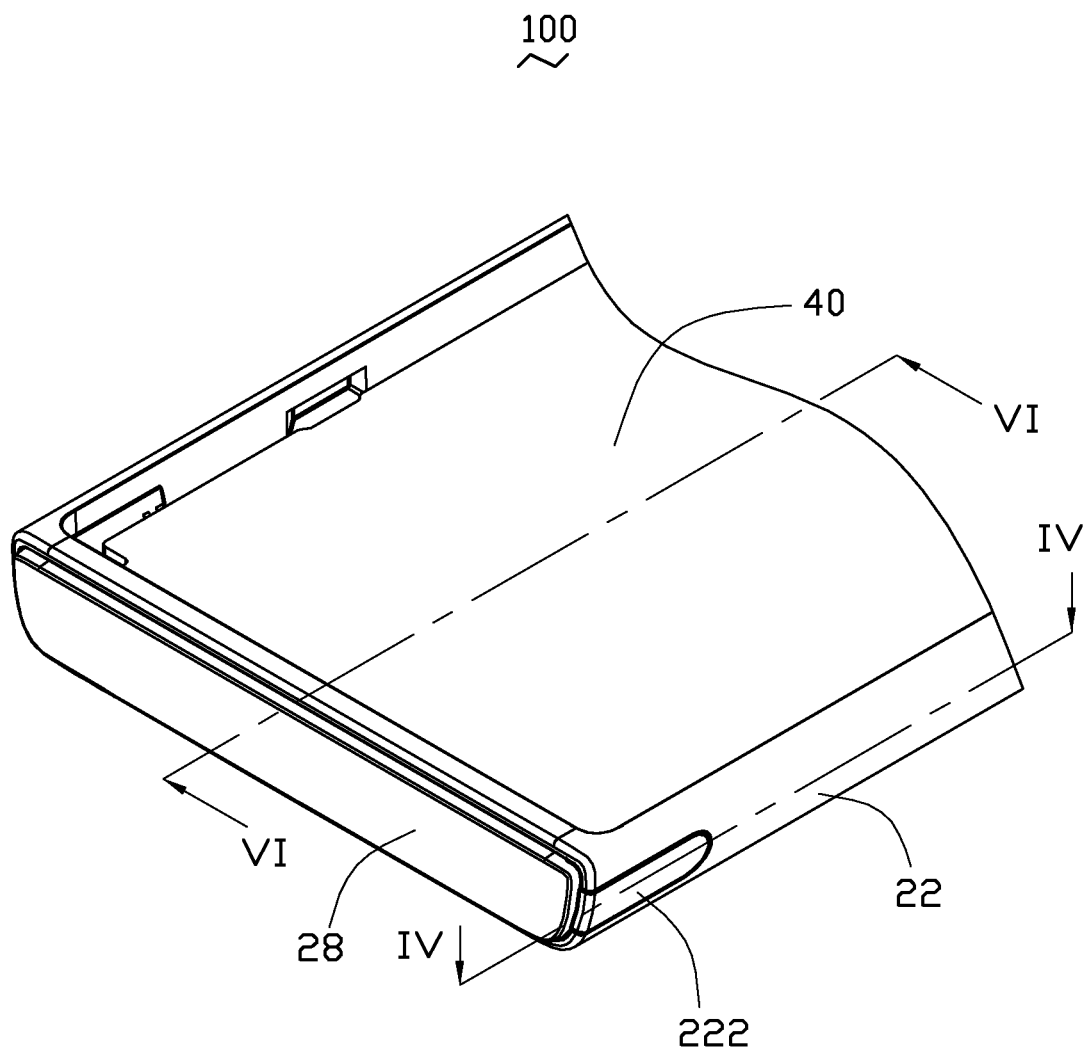
FIG. 3 is an assembled view of the portable electronic device.

FIGS. 1 to 3 show a first embodiment of an electronic device 100, such as a cellular phone or any electronic device using a chip card. The electronic device 100 includes a housing 10, a chip card holder 20, a first retaining board 40, a second retaining board 50.

The chip card holder 20 is attached to the housing 10. Two chip cards 30 can be simultaneously attached to the chip card holder 20. The chip card holder 20 includes a base 22, a drawer 24, a cabinet 26 and a cover 28. The cabinet 26 is defined in the base 22, in which the drawer 24 is received.

The base 22 may be a portion of the housing 10 or a separate element fixed to the housing 10. In this exemplary embodiment, the base 22 is a portion of the housing 10.

The drawer 24 includes a first surface 242, a second surface 243 spaced apart from the first surface 242, two opposite sidewalls 244, a first end 246 and a second end 248 spaced apart from the first end 246. The first surface 242 and the second surface 243 each define a receiving space 2422, in which one of the chip or flash cards 30 is received. Two limiting blocks 2442 protrudes from the sidewalls 244. In this exemplary embodiment, the limiting blocks 2442 are located near the second end 248. A cutout 2462 is defined at the first end 246 and communicates with the receiving spaces 2422 and can be used to facilitate removal of the chips cards 30 from the drawer 24 in the situation where the drawer 24 is completely removed from the cabinet 26

The cabinet 26 includes a receiving compartment 262 and two limiting grooves 264. The drawer 24 is slidably received in the receiving compartment 262. The limiting grooves 264 are located at two sides of the receiving compartment 262 and communicate with the receiving compartment 262. Each limiting block 2442 is slidably received in one of the limiting grooves 264, to limit an inward maximum movement of the drawer 24, when sliding relative to the base 22. While in the current exemplary embodiment, the drawer 24 can be completely removed from the cabinet 26, in other embodiments, there may be additional structure that prevents complete removal of the drawer 24 and limits it outward maximum movement.

The chip cards 30 may both be subscriber identity modules (SIM) card or memory cards; or one of the chip cards 30 is SIM card, the other chip card 30 is memory cards.

The first retaining board 40 and the second retaining board 50 are oppositely attached to the housing 10. The first retaining board 40 has a first electrical connector 42. The second retaining board 50 has a second electrical connector 52. In this exemplary embodiment, the first retaining board 40 and the second retaining board 50 are each circuit boards.

The cover 28 covers the drawer 24 and detachably fixed to the base 22 so the drawer 24 is steadily fixed in the cabinet 26. After the cover 28 is detached from the base 22, the drawer 24 can freely slide out of the cabinet 26. In this exemplary embodiment, the cover 28 is substantially U-shaped, and includes a main body 282 and two latching portions 284 protruding from opposite ends of the main body 282. Each latching portion 284 includes a latching block 2842. The base 22 defines a slot 222 for accommodating the cover 28. The base 22 further defines two latching grooves 224. Each latching block 2842 is latched in one of the latching groove 224 so the cover 28 is latched in the slot 222 and the main body 282 presses the drawer 24 in the cabinet 26.

Figure 4:
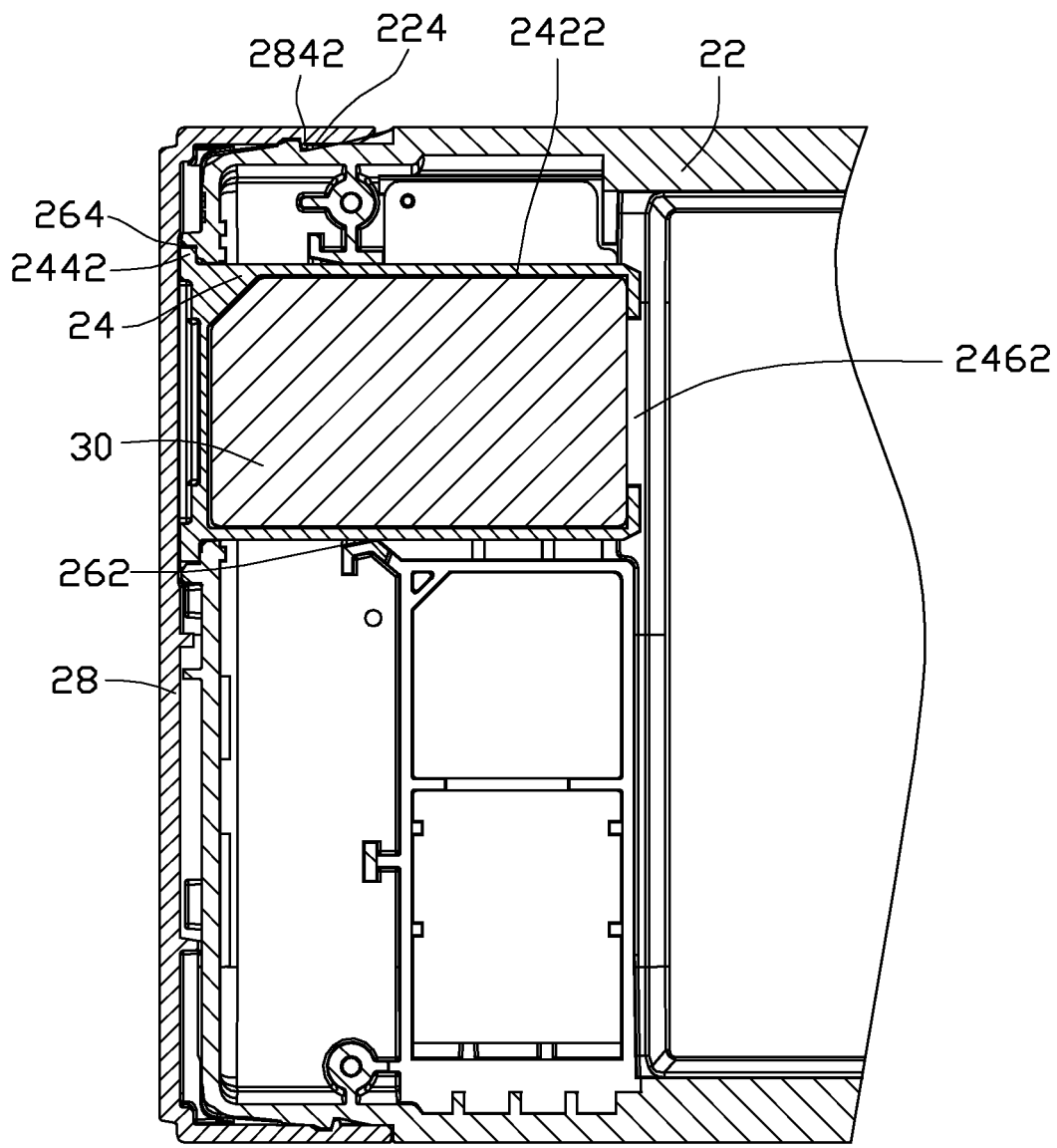
FIG. 4 is a cross sectional view of the electronic device of FIG. 3 along the line of IV-IV.
Figure 5:
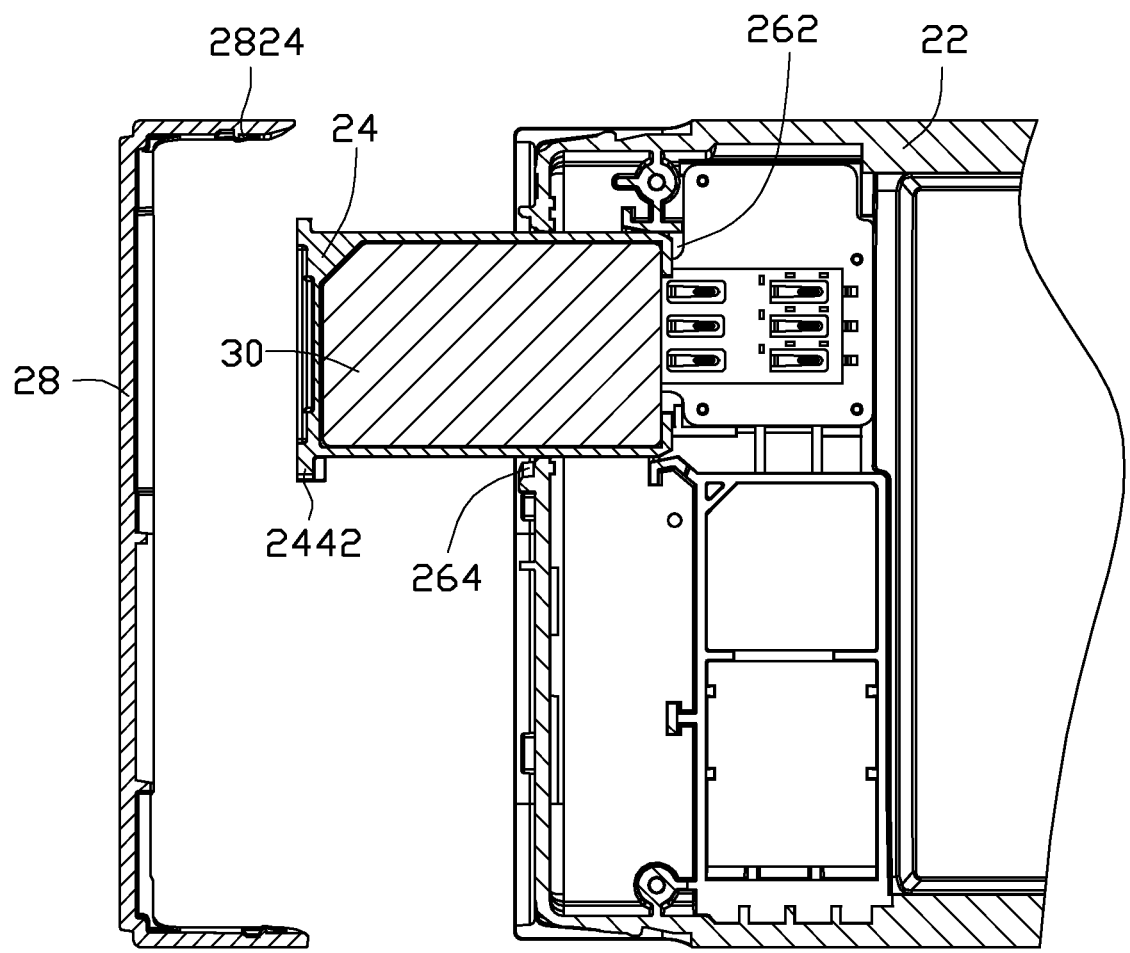
FIG. 5 is similar to FIG. 4, but the chip card(s) is/are ejected out of the housing.
Figure 6:
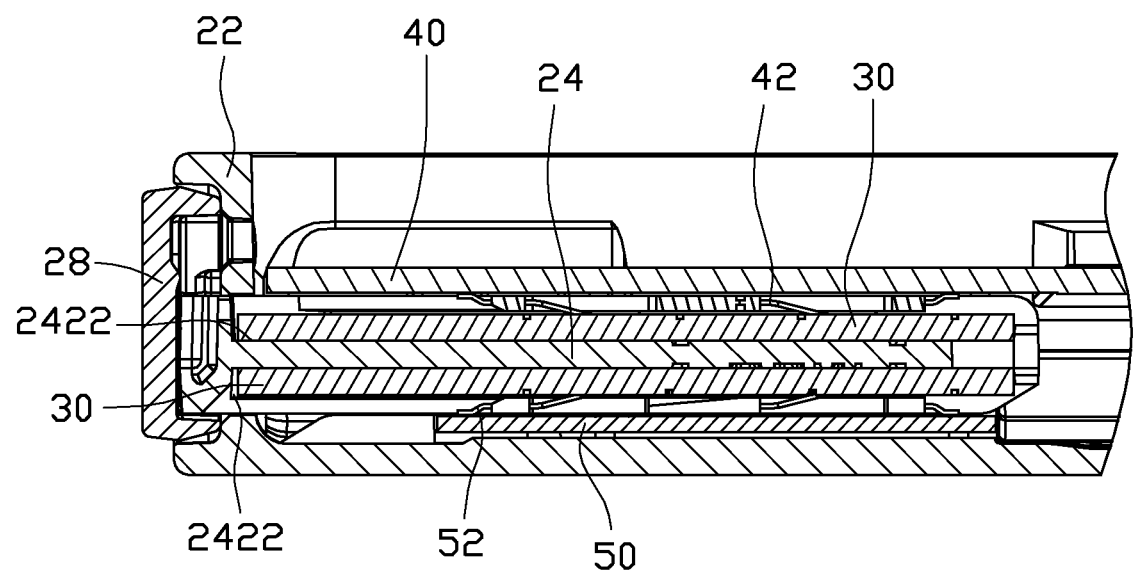
FIG. 6 is a cross sectional view of the electronic device of FIG. 3 along the line of VI-VI.

Referring to FIGS. 4 to 6, in use, the latching blocks 2842 are released from the latching grooves 224. The cover 28 is detached from the housing 10. The cabinet 26 is tilted, and the drawer then automatically slides either partially or entirely out of the cabinet 26 under gravity. The chip cards 30 are put into the receiving spaces 2422. The drawer 24 is slid into the receiving compartment 262 of the cabinet 26 until the limiting blocks 2442 are limited in the limiting grooves 264. At this time, the chip cards 30 respectively and electrically connect with the first connector 42 and the second connector 52. The cover 28 is put in the slot 222, and the latching blocks 2842 are latched in the latching grooves 224 so the cover 28 is fixed in the slot 22. At this time, the main body 282 covers the drawer 24 to limit the drawer 24 in the cabinet 26, thereby putting the chip cards 30 in the electronic device 100.

In above chip card holder 20, after the cover 28 is detached from the base 22, the drawer 24 can automatically slide either partially or entirely out of the cabinet 26 to expose it from the base 22, thereby facilitating grasping chip cards 30 out of the receiving spaces 2422 or putting the chip cards 30 in the receiving spaces 2422.

Although numerous characteristics and advantages of the exemplary disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A chip card holder for holding at least one chip card, the chip card holder comprising:
    a base;
    a drawer slidably attached to the base, the drawer comprising a first surface and a second surface opposite to the first surface, the first surface and the second surface each defining a receiving space, each receiving space for receiving a chip card;
    a cover detachably latched to the base to retain the drawer in the base or allow the drawer to be partially or completely slid out of the base, and the chip card moved along with the drawer for simultaneously being retained in the base or simultaneously being slid out of the base.

2. The chip card holder of claim 1, wherein the cover includes a main body and two latching portions protruding from opposite ends of the main body, each latching portion includes a latching block; the base defines a slot and two latching grooves; each latching block is latched in one of the latching grooves to latch the cover in the slot and the main body presses the drawer in the base.

3. The chip card holder of claim 2, wherein the chip card holder further includes a cabinet defined in the base, the drawer slidably received in the cabinet; when the cover is latched to the base, the cover limits the drawer in the cabinet; after the cover is detached from the base, the drawer partially or completely slide out of the cabinet.

4. An electronic device, comprising:
    a housing; and
    a chip card holder for holding at least one chip card, the chip card holder comprising:
        a drawer slidably attached to the housing, the drawer comprising a first surface and a second surface opposite to the first surface, the first surface and the second surface each defining a receiving space, each receiving space for receiving a chip card; and
        a cover detachably latched to the housing to retain the drawer in the housing or allow the drawer to be partially or completely slid out of the housing, and the chip card moved along with the drawer for simultaneously being retained in the base or simultaneously being slid out of the housing.

5. The electronic device of claim 4, wherein the cover includes a main body and two latching portions protruding from opposite ends of the main body, each latching portion includes a latching block; the housing defines a slot and two latching grooves; each latching block is latched in one of the latching grooves to latch the cover in the slot and the main body presses the drawer in the housing.

6. The electronic device of claim 5, wherein the chip card holder further includes a cabinet defined in the housing, the drawer slidably received in the cabinet; when the cover is latched to the housing, the cover limits the drawer in the cabinet; after the cover is detached from the housing, the drawer partially or completely slide out of the cabinet.

7. The electronic device of claim 6, wherein the drawer comprises two opposite sidewalls, a first end, and a second end opposite to the first end, the two opposite sidewalls, the first end, and the second end cooperatively define the receiving space.

8. The electronic device of claim 7, wherein a cutout is defined at the first end and communicates with the receiving space, the chip card is inserted into the receiving space through the cutout, and is latched by the two opposite sidewalls.

9. The electronic device of claim 8, wherein two limiting blocks protrude from the two opposite sidewalls near the second end, the housing defines two limiting grooves, each limiting block is slidably received in one of the limiting grooves.

10. The electronic device of claim 9, wherein the cabinet defines a receiving compartment, the two limiting grooves are located at two sides of the receiving compartment and communicate with the receiving compartment, the drawer is slid into the receiving compartment until the limiting blocks are limited in the limiting grooves.

* * * * *